United States Patent
Gruner et al.

(10) Patent No.: US 7,213,129 B1
(45) Date of Patent: May 1, 2007

(54) METHOD AND SYSTEM FOR A TWO STAGE PIPELINED INSTRUCTION DECODE AND ALIGNMENT USING PREVIOUS INSTRUCTION LENGTH

(75) Inventors: Fred Gruner, Palo Alto, CA (US);
Mike Morrison, Santa Clara, CA (US);
Kushagra Vaid, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,927

(22) Filed: Aug. 30, 1999
(Under 37 CFR 1.47)

(51) Int. Cl.
*G06F 9/30* (2006.01)
*G06F 7/00* (2006.01)

(52) U.S. Cl. .................... 712/210; 712/204; 712/208; 708/209

(58) Field of Classification Search ............. 712/204, 712/208, 210, 213, 237, 239; 710/65; 341/17, 341/67; 708/209
See application file for complete search history.

(56) References Cited

U.S. PATENT DOCUMENTS

| | | | |
|---|---|---|---|
| 4,502,111 A * | 2/1985 | Riffe et al. ................. 712/204 |
| 5,229,863 A * | 7/1993 | Kao et al. ............... 358/426.03 |
| 5,410,677 A * | 4/1995 | Roskowski et al. ............ 710/65 |
| 5,535,347 A * | 7/1996 | Grochowski et al. ....... 712/204 |
| 5,537,629 A * | 7/1996 | Brown et al. ................ 712/210 |
| 5,581,718 A * | 12/1996 | Grochowski ................ 712/204 |
| 5,600,806 A * | 2/1997 | Brown et al. ................ 712/204 |
| 5,619,666 A * | 4/1997 | Coon et al. .................. 712/208 |
| 5,646,873 A * | 7/1997 | Shimazawa et al. ........ 709/209 |
| 5,666,115 A * | 9/1997 | Colavin ....................... 341/67 |
| 5,668,548 A * | 9/1997 | Bakhmutsky ................. 341/67 |
| 5,724,422 A * | 3/1998 | Shang et al. ................ 711/216 |
| 5,809,272 A * | 9/1998 | Thusoo et al. .............. 712/210 |
| 5,944,818 A * | 8/1999 | Baxter et al. ............... 712/244 |
| 6,005,417 A * | 12/1999 | Mehta et al. .................. 326/98 |
| 6,496,923 B1* | 12/2002 | Gruner et al. .............. 712/213 |

OTHER PUBLICATIONS

Merriam-Webster's Collegiate Dictionary; Tenth Edition; Merriam-Webster, Inc., Springfield, Mass.; 2001; pp. 168.*

* cited by examiner

*Primary Examiner*—Meng-Al T. An
*Assistant Examiner*—William H. Wood
(74) *Attorney, Agent, or Firm*—Blakely, Sokoloff, Taylor & Zafman LLP

(57) ABSTRACT

A system and method for aligning an instruction stream is described. The system comprises a rotator logic unit for rotating data bytes of the instruction stream. A shifter logic unit is used for shifting the data bytes to the start of a instruction based upon a length of an immediately prior instruction.

16 Claims, 8 Drawing Sheets

METHOD AND SYSTEM FOR A TWO STAGE PIPELINED INSTRUCTION DECODE AND ALIGNMENT USING PREVIOUS INSTRUCTION LENGTH

FIELD OF THE INVENTION

The present invention pertains generally to the field of computer systems and more particularly to a system and method for decoding the links of macrocode instructions within pipelined or super pipelined microprocessors.

BACKGROUND OF THE INVENTION

Processors (including, but not limited to, general and special purpose microprocessors, micro-controllers, and digital signal processors (DSPs)) typically include execution units that execute a sequence of instructions, termed micro-instructions, derived from a computer program. Many computer programs are written in a high level language that is not directly executable by the central processing unit (CPU) of a computer and the instructions of such programs must accordingly be decoded into a form suitable for execution by the CPU. For example, a program may be written in a high level language such as C, C++, or Java, and then compiled into a corresponding sequence of macro-instructions, which are in turn decoded into micro-instructions for eventual execution. Programs can also be written directly of a series of macro-instructions (that is, machine code).

Macro-instructions are commonly stored as contiguous data blocks in a memory resource, such as main memory (ergo, RAM) or in a cache, for retrieval and supplied to a decoder unit within a processor for decoding into micro-instructions. To enable the decoder unit successfully to decode macro-instructions, it will be appreciated that it is necessary to identify instruction boundaries within retrieve data blocks, that constitute the instruction stream, that indicate where one macro-instruction ends and the next begins.

The task of identifying such instruction boundaries by processors having complex instruction set (CISC) architectures, such as the Intel architecture (IA) developed by Intel Corporation of Santa Clara, Calif., is complicated by the use of a variable-length instruction set (e.g., the Intel architecture (IA) instruction set). Specifically, in reduced instruction set computer (RISC) processor architectures and instruction sets, macro-instructions typically had a fixed length, in which case the boundaries between instructions can be determined with relative ease once an initial boundary is identified, as each instruction has a known length. For a variable-length instruction set, once an initial boundary location is identified, the length of each macro-instruction must be ascertained to identify subsequent instruction boundaries. The task of identifying boundaries is further complicated by a variable-length instruction set that, for the purposes of supporting legacy programs, supports multiple data and addressing sizes.

SUMMARY OF THE INVENTION

A system and method for aligning an instruction stream is described. The system comprises a rotator logic unit for rotating data bytes of the instruction stream. A shifter logic unit is used for shifting the data bytes to the start of the instruction based upon a length of an immediately prior instruction.

BRIEF DESCRIPTION OF THE DRAWINGS

The objects, features and advantages of the present invention will be apparent to one skilled in the art in light of the following detailed description in which.

DETAILED DESCRIPTION

A system and method for a two stage instruction length decode and alignment of macro-instructions are described.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
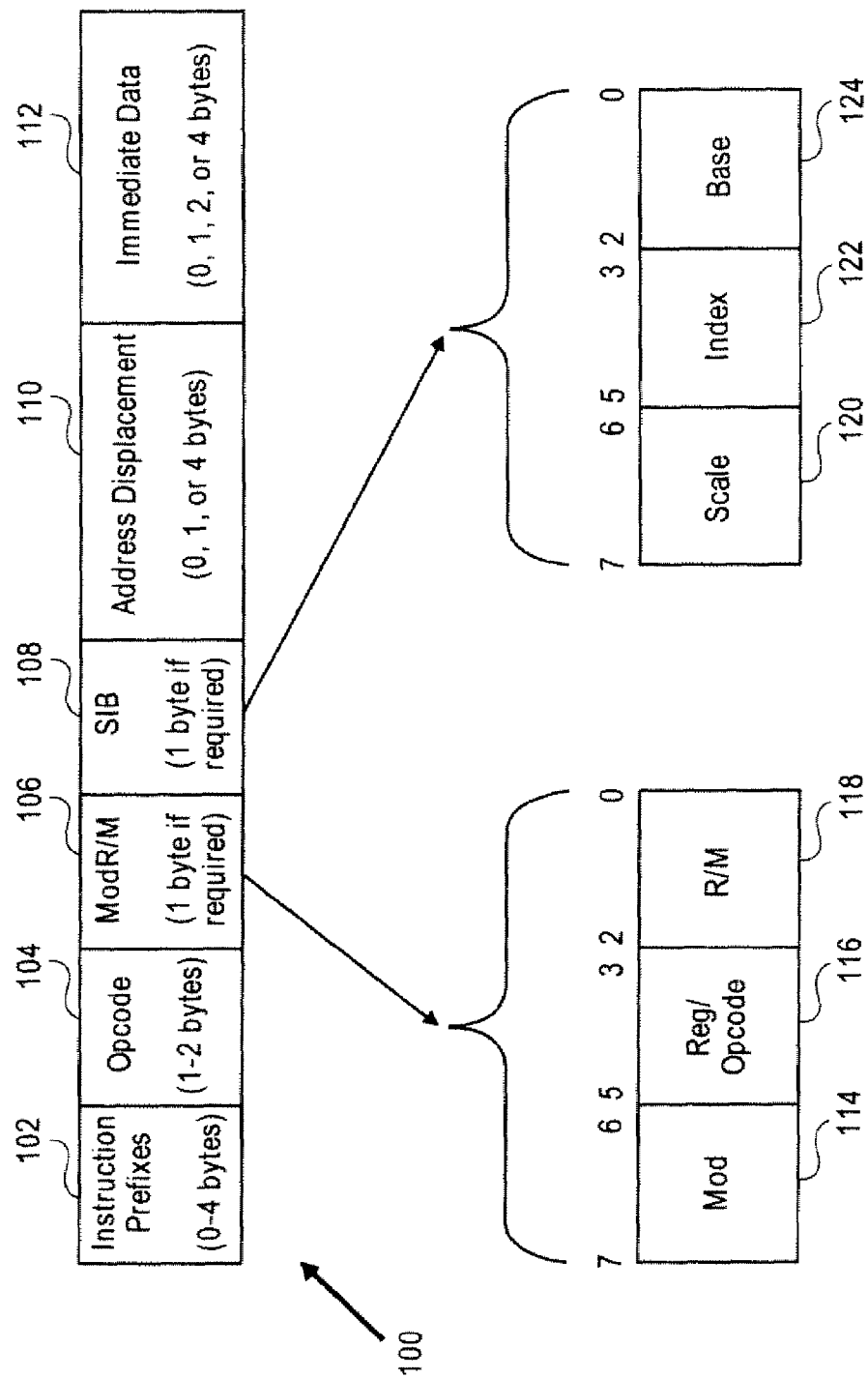
FIG. 1 is a block diagram illustrating an exemplary format of a macro-instruction consisting of bytes that may be decoded according to the present invention.

FIG. 1 is a diagrammatic representation of an exemplary macro-instruction 100 consisting of bytes that may be decoded according to the teachings of the present invention. Specifically, FIG. 1 illustrates the format of an exemplary macro-instruction forming the part of the Intel architecture (IA) instruction set, as developed by Intel Corporation of Santa Clara, Calif. For purposes of the present specification, the terms "macro-instruction" and "instruction" shall both be taken to refer to what is commonly understood to be a macro-instruction and not a micro-instruction.

As defined within the Intel architecture instruction set, an exemplary macro-instruction 100 may comprise instruction prefixes 102 (each instruction prefix 102 being 0–4 bytes in length), an opcode 104 (1–2 bytes in length), a ModR/M operand indicator 106 (0–1 byte in length), an SIB of 108 (0–1 lengths in byte), address displacement 110 (0, 1 or 4 bytes in length), and an intermediate data constant 112 (0, 1 or 4 bytes in length). Opcode 104 may be either one or two bytes in length. For two-byte opcodes, the first byte is 0F.

ModR/M, if present, is one byte in length and comprises a mod field 114, reg/opcode field 116 and the R/M field 118. The mod field 114 combines with the R/M field 118 to form 32 possible values: 8 register and 24 addressing modes. The reg/opcode field 116 specifies either a register number or three more bits of opcode information. The reg/opcode field 116 use is specified in the first byte of the primary opcode 104. The R/M field 118 may specify a register as operand or may be combined with the mod field 114 to encode an addressing mode. Certain encodings of the ModR/M byte 106 require a second addressing byte, the Scale Index Base (SIB) byte 108, to fully specify the addressing mode of the instruction. The base-plus-index and base-plus-scaled-index forms of 32-bit addressing require the SIB byte 108. SIB byte 108 includes a scale field 120, which specifies the scale factor, index field 122, which specifies the register number of the index register, and base field 124 which specifies the register number of the base register.

Current processors, such as for example the Pentium Pro® or the Pentium II® Processors, may operate in either a 16- or 32-bit mode. Each macro-instruction may be decoded and executed as:
1. A fixed 8-bit data/address instruction;
2. A fixed 16-bit data/address instruction; or
3. A variable 16- or 32-bit data/address instruction, as determined by a mode operation bit (commonly termed a D-bit) within the IA processor.

Figure 2:
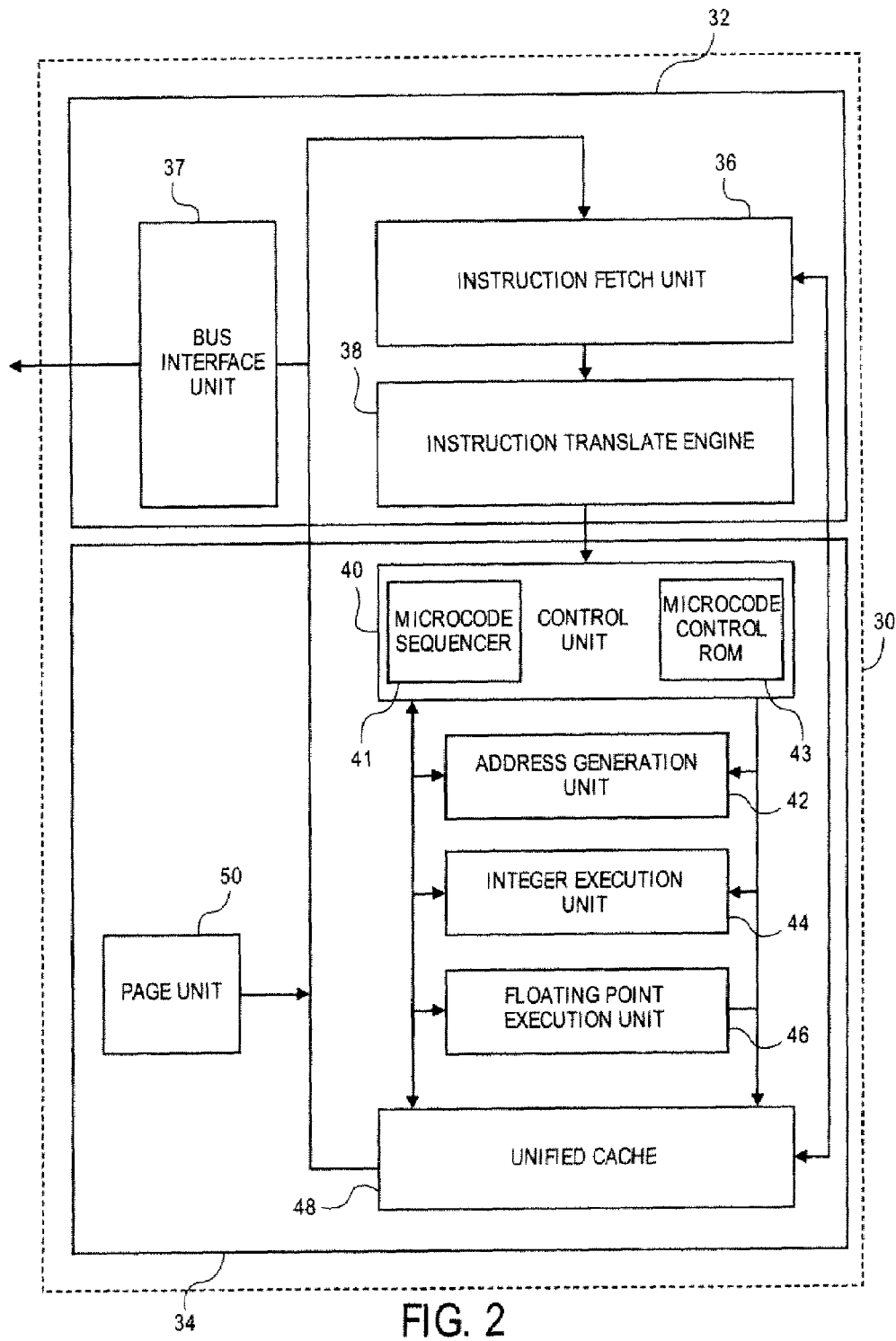
FIG. 2 is a block diagram showing an architecture of an exemplary microprocessor within which the present invention may be implemented.

FIG. 2 is a block diagram showing an exemplary microprocessor 30 within which the present invention may be implemented. The microprocessor 30 is pipelined and includes in-order front-end circuitry 32 and out-of-order back-end circuitry 34. The out-of-order back-end circuitry 34 executes micro-instructions in an out-of-order fashion and retires executed micro-instructions in an in-order fashion according to the original sequence in the macro instruction. The front-end circuitry 32 comprises an instruction fetch engine 36 that retrieves macro-instructions, which may conform to the format illustrated in FIG. 1, via a bus interface unit 37 from a main memory (not shown) associated with a microprocessor 30, or from an internal unified cache 48 that caches both macro-instructions and data. In an alternative embodiment, cache 48 may be located downstream of an instruction translate engine 38 and may cache decoded micro-instructions derived from macro-instructions. Macro-instructions retrieved by the instruction fetch engine 36 are then propagated to the instruction translate engine 38 that translates macro-instructions into corresponding micro-instructions. Micro-instructions are issued from the instruction translate engine 38 to a control unit 40 (also referred to as a microcode unit), that forms part of the back-end circuitry 34, and includes a microcode sequencer (MS) 41 and a microcode control read-only memory (ROM) 43. The control unit 40 interprets the micro-instructions sent to it, and handles exceptions, break points, and interrupts. From the control unit 40, micro-instructions are dispatched to a pipeline including an address generation unit 42, an integer execution unit 44 (also known as an arithmatic/logic unit (ALU)) and/or a floating point execution unit 46.

The microprocessor 30 further includes a page unit 50 that translates linear addresses into physical addresses, and includes at least one translation look-aside buffer (TLB) for this purpose.

Figure 3:
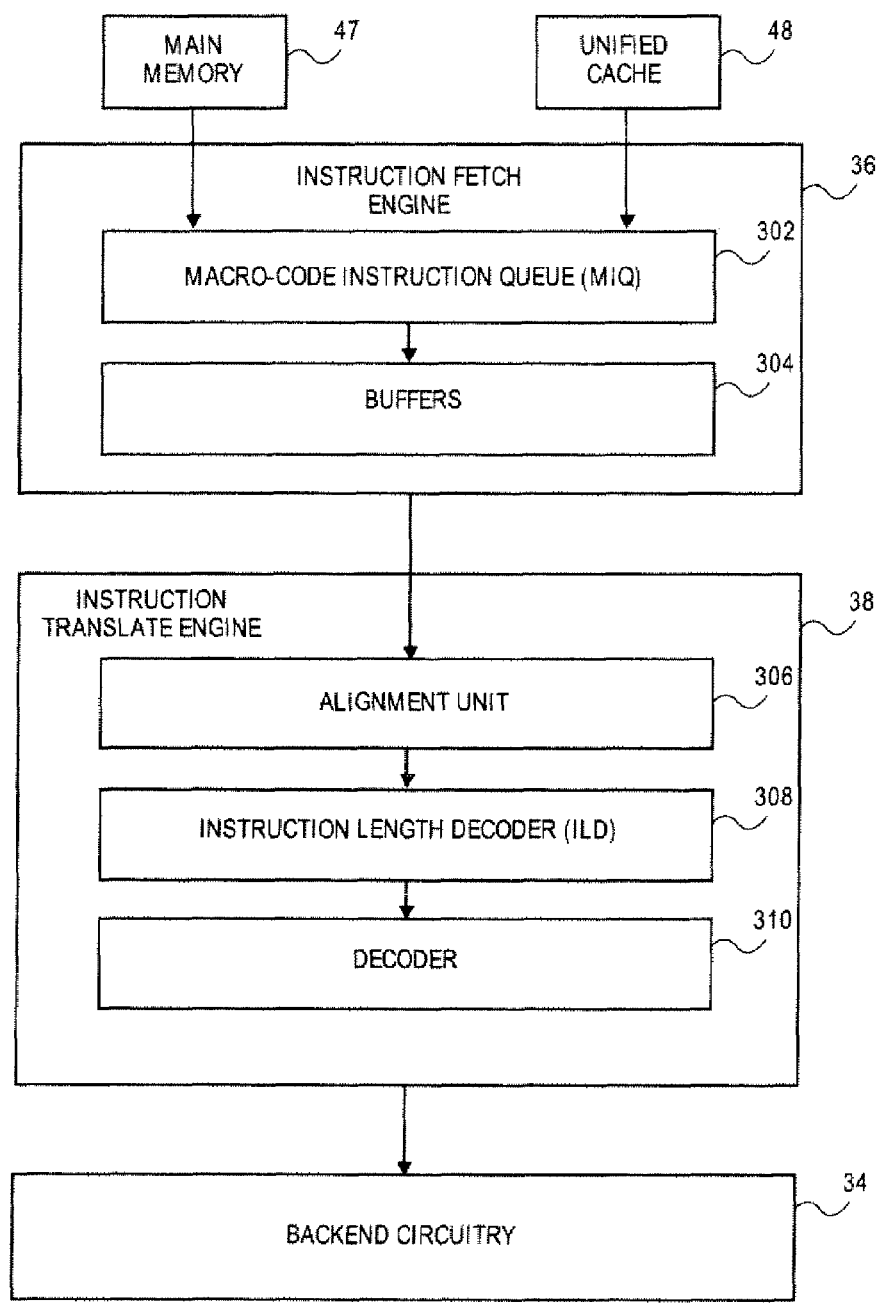
FIG. 3 is a block diagram showing architectural details regarding an instruction fetch engine and an instruction translate engine, according to exemplary embodiment of the present invention, that may be incorporated into the microprocessor shown in FIG. 2.

FIG. 3 is a block diagram showing further details regarding the instruction fetch engine 36 and the instruction translate engine 38 of the exemplary microprocessor shown in FIG. 2. The instruction fetch engine 36 is shown to include a macrocode instruction queue (MIQ) 302 for receiving macro-instructions from main memory 47 or unified cache 48. Alignment buffers 304 buffer macro instructions before they are dispatched to the instruction translate engine 38.

The alignment unit (ALN) 306 is responsible for aligning the instruction stream. ALN 306 determines where a fetch set of data the instruction to be executed begins and ends. A pointer within alignment buffers 304 is adjusted to point to the next instruction to be executed in the processor. Using the length of the previous instruction and the known starting point of the previous instruction, ALN 306 shifts the data stream pointer in order to align the pointer to the beginning of the next instruction in the data stream. ALN 306 aligns the instruction one pipe stage behind the length decode of the instruction. The present invention decodes one instruction per cycle within two pipe stages.

In the second pipe stage, instruction length decoder (ILD) 308 determines the length of the current instruction. IA instructions are variable length instructions varying in length from 1 to 15 bytes with prefixes and 1 to 11 bytes without prefixes. In order to properly align and decode the instructions, the length of the instruction must be determined. The bytes that are received from the ALN 306 stage are assumed to start with the first byte of instruction. The ILD 308 decodes these instruction bytes, determines the length of the instruction, and sends the length to the ALN 306 for subsequent instruction realignment and to a decode stage for marking the instruction boundaries.

ILD 308 decodes instruction lengths in one pipe stage. All instruction lengths are computed in the same clock cycle. Instructions with prefixes take up to N+1 clock cycles, where N is the number of prefixes preceding the instruction. In one embodiment, the parallel computation of the instruction data is used to determine the lengths of individual components and then these components are merged together to determine the total resulting length. Decoding length information in one cycle and using this length information for alignment in the same cycle allows the present invention to reduce overhead performance loss. In addition, in one embodiment, less chip area may be utilized in order to implement the present invention.

ILD 308 creates an output length vector, which is utilized in decoder 310 for the decoding of the instruction. In one embodiment, a two-stage alignment-decode mechanism for the alignment (ALN) and length (LEN) or decode stages is used. ALN 306 includes one or more buffers for holding fetched information, and for communication with the fetch engine 36 for fetching instructions from memory or cache. ALN 306 precedes ILD 308 where instructions are initially decoded. ALN 306 fetches one or more instructions from memory or cache and determines where the next instruction begins and ends. Instruction data is fetched from the cache and stored in the buffer, or in one of the plurality of buffers. ILD 308 determines the length of the instruction in order to align the next instruction within the buffer.

Figure 4:
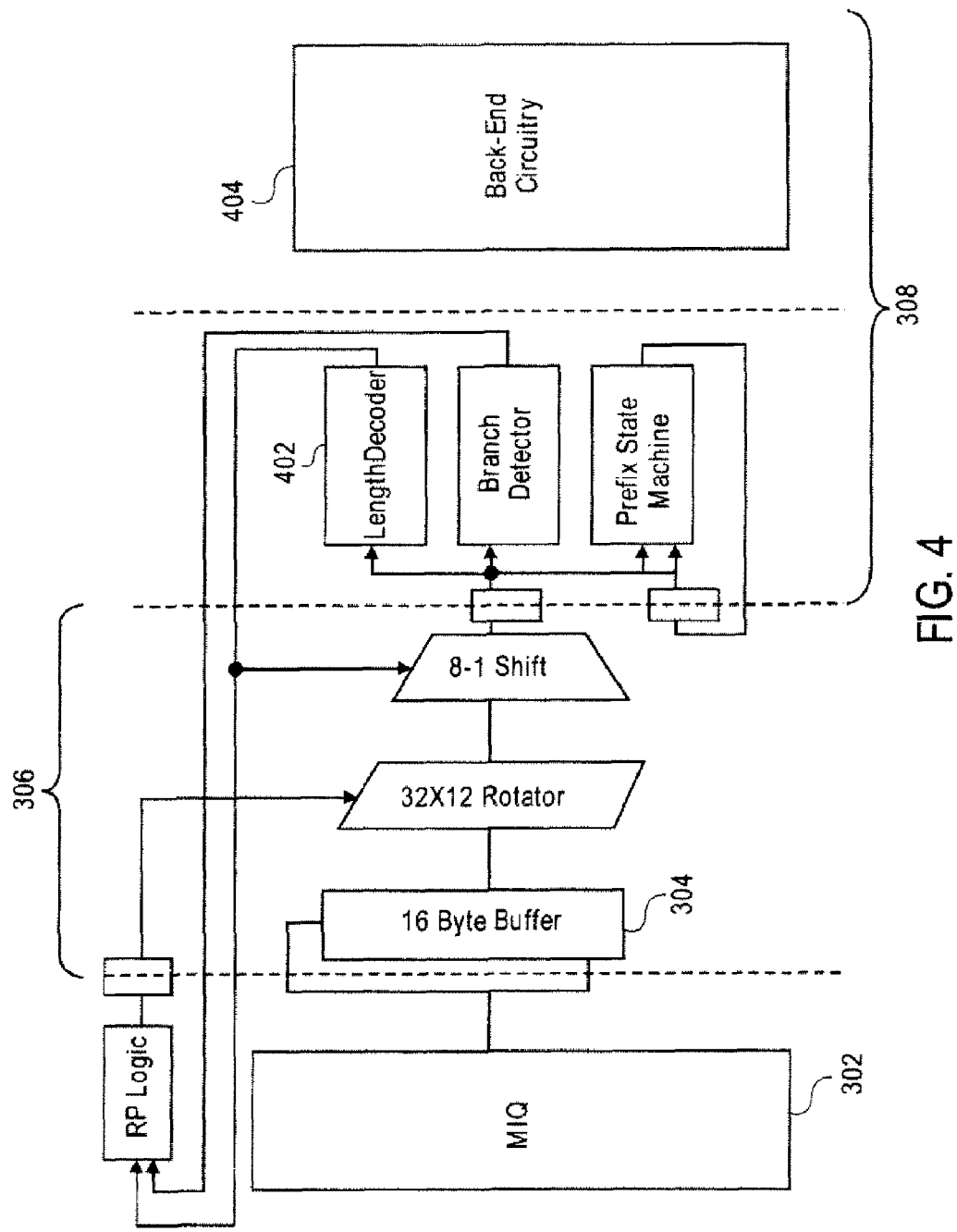
FIG. 4 is block diagram showing architectural details of one embodiment of an instruction length decoder (ILD) within the instruction pipe.

FIG. 4 is a block diagram showing architectural details of one embodiment of an instruction length ALN 306 and ILD 308 with the instruction pipe. Length Decode (LEN) 402 is housed within the ILD 308. In addition, ILD 308 contains back-end circuitry 404 for processing the decoded instructions.

LEN 402 receives the instruction data from ALN 306 and determines the length of the instruction. The instruction length is used by the ALN 306 to shift the next instruction. In addition, LEN 402 calculates the prefix count and shifts the instruction lengths by the prefix count. If the length of the instruction exceeds 15 bytes, LEN 402 flags a length violation. The decoded instructions are passed to back-end circuitry 404 for processing.

LEN 402 is also responsible for decoding prefixes. Prefix State Machine looks at instruction byte 0 to determine if a prefix was encountered and to determine the prefix type. Prefix State Machine also counts prefixes it has encountered for a particular instruction.

Figure 5:
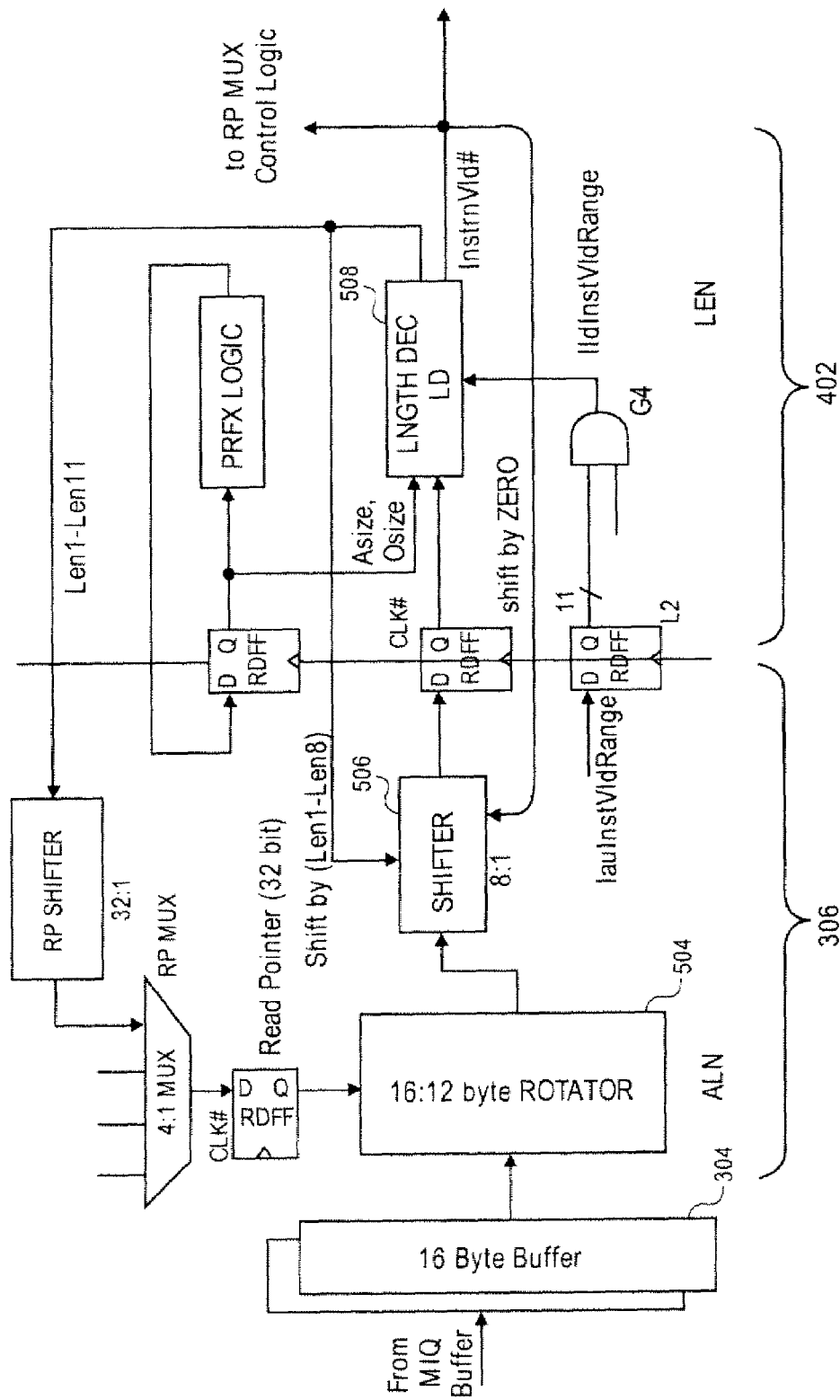
FIG. 5 is a block diagram showing architectural details of a portion of the ILD.

FIG. 5 is a block diagram showing architecture details of ALN 306 and LEN 402. Data stream bytes are received into two 10×16-byte buffers 304 from MIQ buffers 302. The data stream is rotated into rotator 504. In one embodiment, rotator 504 consists of 12 bytes. Rotator 504 rotates the data bytes of two instructions. In one embodiment, an instruction has a maximum length of 11 bytes (without prefixes). If 12 bytes captures both instructions, then ALN 306 will have a maximum throughput. Rotator 504 is one pipe stage behind the decoding of the current instruction. Using the length vector obtained from the LEN 402, ALN 306 next shifts the current instruction into shifter 506. Shifter 506 shifts to the exact instruction start based on the length of the first instruction in the data stream. If rotator 504 does not contain the entire instruction required by shifter 506, rotator 504 rotates instruction data from buffers 304. Shifter 506 output gives the current instruction for the current pipe stage. It is assumed that the first instruction within the data stream begins at the beginning of the data buffer. Thus, during the current pipe stage, rotator 504 is obtaining instruction data for the current instruction while shifter 506 is obtaining data for the next instruction in the data stream.

Referring to Table 1, an example of the alignment of one embodiment is shown. Table 1 shows the contents of buffers 304. In this example, it is assumed that instruction A is being executed and has a length of 5 bytes. This example assumes that no branches are present in the current buffer.

TABLE 1

|  | Buffer 1 |
| --- | --- |
| Byte 1 |  |
| Byte 2 | A |
| Byte 3 |  |
| Byte 4 |  |
| Byte 5 |  |
| Byte 6 |  |
| Byte 7 | B |
| Byte 8 |  |
| Byte 9 |  |
| Byte 10 | C |
| Byte 11 |  |
| Byte 12 |  |

Initially, rotator 504 contains bytes 2–13 as shown in Table 2 for time 1. The shifter 506 contains bytes 2–9 and length is 0. LEN 402 determines the length of A. The length of A is returned to shifter 506. At time 2, shifter 506, using the length of A of 5 bytes, shifts bytes from rotator 504 into shifter 506 offset by the length of A and shifts A to LEN length decode unit (LD) 508. Thus, rotator 504 contains bytes 2–13, the shifter 506 now contains bytes 7–13, and LEN 402 contains bytes 2–6 (instruction A). Shifter 506 then shifts bytes 7–14 to LEN 402 for length determination of instruction B. At time 3, shifter 506, using the length of B of 3 bytes, shifts instruction B into LEN 402, bytes 10–17 are shifted into shifter 506, and rotator contains bytes 7–18. The process is repeated in order to shift instruction C into LEN 402 as shown in Table 2.

TABLE 2

| Time | 1 | 2 | 3 | 4 |
| --- | --- | --- | --- | --- |
| ALN Rotator Output (Buffer Bytes) | 2–13 | 2–13 | 7–18 | 10–21 |
| ALN Shifter Output (Buffer Bytes) | 2–9 | 7–14 | 10–17 | 12–19 |
| Length in LEN | 0 | 5 | 3 | 2 |
| Instruction in LEN |  | A | B | C |

Instruction prefixes 102 are handled as length 1 instructions. This enables the LEN 308 to decode the prefixes one prefix at a time. When the two instruction buffers 304 do not represent consecutive addresses (that is, a branch is predicted to be taken), a clock cycle is used to clean-up and reset the read pointer to the target of the branch.

Figure 6A:
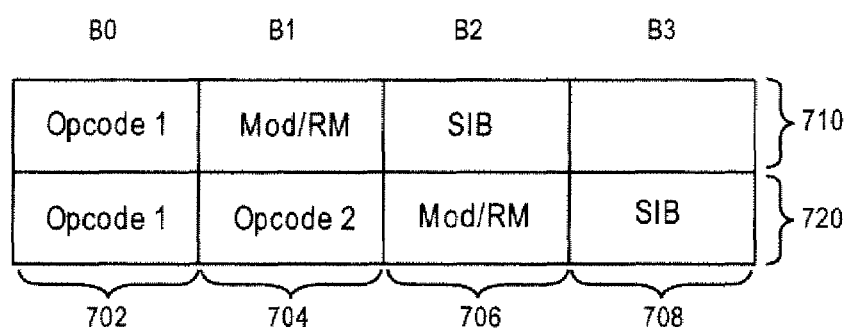
FIG. 6a is a block diagram of one embodiment of a portion of the macro-instruction shown in FIG. 1 consisting of bytes 0–3 that may be decoded according to the present invention

Referring to FIG. 6*a*, the first four bytes of a macro-instruction are shown in two configurations. Configuration 1 (710) shows a one-byte opcode 104, the ModR/M byte 106, and the SIB byte 108. The opcode 104 is in byte 0 (702), the ModR/M byte 106 is in byte B1 (704), and the SIB byte 108 is in byte B2 (706). The second configuration 720 shows a two-byte opcode 104 configuration. In this configuration, the opcode 104 occupies bytes B0 (702) and B1 (704), the ModR/M byte 106 occupies byte B2 (706), and the SIB byte 108 occupies byte B3 (708).

Figure 7:
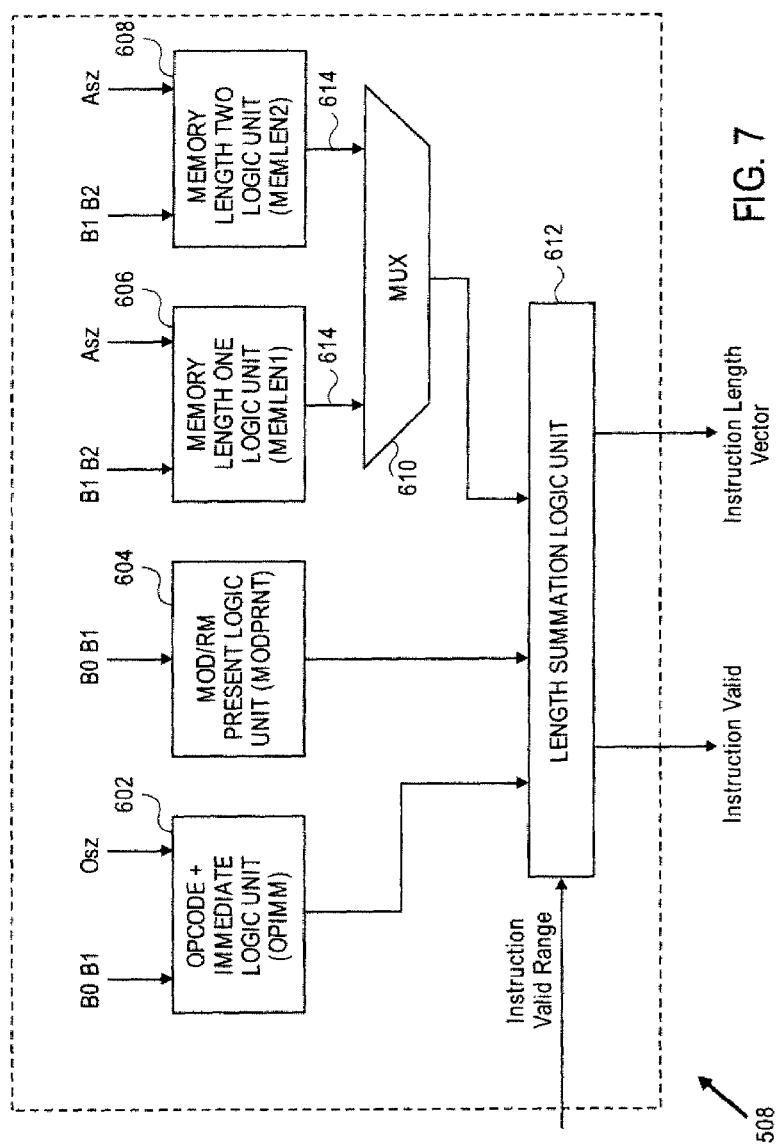
FIG. 7 is a block diagram showing architectural details of one embodiment for the length decode unit.

FIG. 7 is a block diagram showing architectural details of one embodiment of the length decode unit (LD) 508. LD 508 determines the length of various portions of the instruction received from ALN 306. ALN 306 shifts the current instruction from the shifter 506 onto the LD 508. Within the 508, opcode-plus-immediate logic unit OPIMM 602 determines the length of the opcode 104 and immediate data 112 of the current instruction. B0 and B1 are inputs to OPIMM 602 together with the operand-size (Osz) signal. The Osz signal selects the sizes of operands that instructions operate on. When the 16-bit Osz signal is in force, operands may be either 8 or 16 bits. When the 32-bit Osz signal is in force, operands may be 8 or 32 bits.

Simultaneously, a ModR/M present logic unit (MOD-BRNT) 604 determines if the ModR/M 106 is required. B0 and B1 are input into the MODPRNT 604 logical unit. The MODPRNT 604 logical unit performs a lookup of the opcode to determine whether a ModR/M byte is required.

LD 508 also determines memory address displacement length 614 for address displacement 110. LD 508 assumes that the ModR/M byte 106 is present and determines memory address displacement length 614 for both the one-byte and two-byte opcodes. A memory-length-one logic unit (MEMLEN1) 606 determines an anticipatory length of the memory displacement based on an assumption that a one-byte opcode 104 is present. MEMLEN1 606 uses the input from bytes B1 and B2. This corresponds to configuration 710 of FIG. 6*a*. In addition, an address-size (Asz) signal is provided to MEMLEN1 606. The Asz signal selects the sizes of addresses used to address memory, either 16 or 32 bits. When the 16-bit Asz signal is in force, segment offsets and displacements are 16-bits. This limits the size of a segment that may be addressed to 64 KiloBytes. When the 32-bit Asz signal is in force, segment offsets and displacements are 32-bits, allowing segments up to 4 GigaBytes to be addressed.

A memory-length-two logic unit (MEMLEN2) 608 determines an anticipatory length of the memory based on an assumption that a two-byte opcode 104 is present. The MEMLEN2 608 uses the input from B2 and B3, corresponding to the second configuration 720 of FIG. 6*a*, together with Asz. The output from MEMLEN1 606 and MEMLEN2 608 are multiplexed by multiplexer (MUX) 610, and a MEMLEN is output depending upon whether a one-byte or two-byte opcode is present.

The outputs from OPIMM 602, MODBRNT 604, and from MUX 610 are combined together by a length-summation logic unit 612. Length-summation logic unit 612 adds the lengths based on whether the ModR/M byte 106 is required by the opcode 104. Length-summation logic unit 612 creates two outputs: an instruction valid signal and an instruction length vector.

Using an instruction valid range input, length-summation logic unit 612 determines if the instruction is a valid instruction by combining the instruction valid range and the instruction length. In one embodiment, an instruction may be from 1 to 11 bytes in length.

Figure 6B:
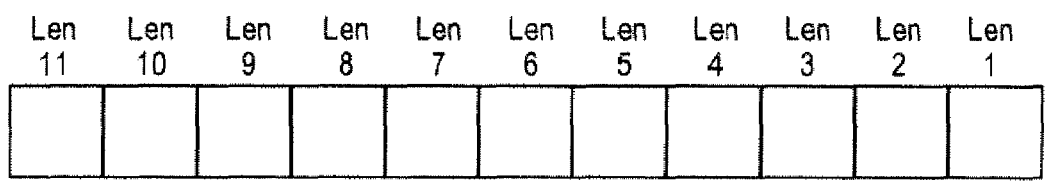
FIG. 6b is a block diagram of one embodiment of an instruction length vector.

The instruction length vector is an 11-byte vector as shown in FIG. 6*b*. The instruction length vector is set to all zeroes except for the byte that indicates the length of the instruction, which is set to 1 for the length. Thus, if the instruction is 11 bytes in length, Len 11 is set to 1 and all other bits are set to 0. If the instruction is invalid, the instruction length vector is set to all zeroes. If the instruction is invalid, the shifter 506 does not shift the next instruction into the length decode and a clock cycle is required to realign the instructions.

Table 3 shows the possible outputs from OPIMM 602. The outputs are dependent on whether the opcode 104 is one or two bytes and the possible lengths of the immediate data 112. The immediate data may be 1, 2, 4 or 6 bytes in length. Thus, the opcode plus immediate may be 1, 2, or 6 bytes in length. Table 3 indicates the possible combinations of opcode and immediate displacement.

TABLE 3

| OPCODE BYTE 1 | OPCODE BYTE 2 | 1 BYTE IMM | 2 BYTE IMM | 4 BYTE IMM | 6 BYTE IMM | OPCODE + IMM LENGTH |
|---|---|---|---|---|---|---|
| X | — | — | — | — | — | 1 |
| X | X | — | — | — | — | 2 |

TABLE 3-continued

| OPCODE BYTE 1 | OPCODE BYTE 2 | 1 BYTE IMM | 2 BYTE IMM | 4 BYTE IMM | 6 BYTE IMM | OPCODE + IMM LENGTH |
|---|---|---|---|---|---|---|
| X | — | X | — | — | — | 2 |
| X | X | X | — | — | — | 3 |
| X | — | — | X | — | — | 3 |
| X | — | X | X | — | — | 4 |
| X | X | — | X | — | — | 4 |
| X | — | — | — | X | — | 5 |
| X | X | — | — | X | — | 6 |
| X | — | — | — | — | X | 7 |

Table 4 indicates the possible outputs from MUX 610. Depending on whether a ModR/M or SIB byte are present and the valid, possible displacements, the displacement length is determined. The possible memory displacements are 1, 2 or 4 bytes. The possible memory displacements may be 1, 2, 3, 5 or 6 bytes in length. With the valid, possible combinations, it is not possible to have a memory displacement of four bytes in length.

TABLE 4

| ModR/M PRESENT | SIB PRESENT | 1 BYTE DISP | 2 BYTE DISP | 4 BYTE DISP | DISP LENGTH |
|---|---|---|---|---|---|
| Y | N | — | — | — | 1 |
| Y | Y | — | — | — | 2 |
| Y | N | X | — | — | 2 |
| Y | Y | X | — | — | 3 |
| Y | N | — | X | — | 3 |
| — | — | — | — | — | 4 NOT POSSIBLE |
| Y | N | — | — | X | 5 |
| Y | Y | — | — | X | 6 |

Table 5 shows the possible outputs for the instruction length vector of length summation logic unit 612. The table shows the combinations of the outputs from the OPIMM 602, MODPRNT 604, and MUX 610. Total instruction length may be from 1 to 11 bytes as indicated in Table 5.

TABLE 5

| MEMLEN | OPIMM7 | OPIMM6 | OPIMM5 | OPIMM4 | OPIMM3 | OPIMM2 | OPIMM1 | LENGTH |
|---|---|---|---|---|---|---|---|---|
| 6 | — | — | YES | — | — | — | — | 11 |
| 6 | — | — | — | NO | — | — | — | 10 |
| 6 | — | — | — | — | YES | — | — | 9 |
| 6 | — | — | — | — | — | YES | — | 8 |
| 6 | — | — | — | — | — | — | YES | 7 |
| 5 | — | NO | — | — | — | — | — | 11 |
| 5 | — | — | YES | — | — | — | — | 10 |
| 5 | — | — | — | NO | — | — | — | 9 |
| 5 | — | — | — | — | YES | — | — | 8 |
| 5 | — | — | — | — | — | YES | — | 7 |
| 5 | — | — | — | — | — | — | YES | 6 |
| 4 | Not Applicable | Not Applicable | Not Applicable | Not Applicable | Not Applicable | Not Applicable | Not Applicable | — |
| 3 | NO | — | — | — | — | — | — | 10 |
| 3 | — | NO | — | — | — | — | — | 9 |
| 3 | — | — | YES | — | — | — | — | 8 |
| 3 | — | — | — | NO | — | — | — | 7 |
| 3 | — | — | — | — | YES | — | — | 6 |
| 3 | — | — | — | — | — | YES | — | 5 |
| 3 | — | — | — | — | — | — | YES | 4 |
| 2 | NO | — | — | — | — | — | — | 9 |
| 2 | — | NO | — | — | — | — | — | 8 |

TABLE 5-continued

| MEMLEN | OPIMM7 | OPIMM6 | OPIMM5 | OPIMM4 | OPIMM3 | OPIMM2 | OPIMM1 | LENGTH |
|---|---|---|---|---|---|---|---|---|
| 2 | — | — | YES | — | — | — | — | 7 |
| 2 | — | — | — | NO | — | — | — | 6 |
| 2 | — | — | — | — | YES | — | — | 5 |
| 2 | — | — | — | — | — | YES | — | 4 |
| 2 | — | — | — | — | — | — | YES | 3 |
| 1 | NO | — | — | — | — | — | — | 8 |
| 1 | — | NO | — | — | — | — | — | 7 |
| 1 | — | — | YES | — | — | — | — | 6 |
| 1 | — | — | — | NO | — | — | — | 5 |
| 1 | — | — | — | — | YES | — | — | 4 |
| 1 | — | — | — | — | — | YES | — | 3 |
| 1 | — | — | — | — | — | — | YES | 2 |
| NO ModR/M | YES | — | — | — | — | — | — | 7 |
| NO ModR/M | — | YES | — | — | — | — | — | 6 |
| NO ModR/M | — | — | YES | — | — | — | — | 5 |
| NO ModR/M | — | — | — | YES | — | — | — | 4 |
| NO ModR/M | — | — | — | — | YES | — | — | 3 |
| NO ModR/M | — | — | — | — | — | YES | — | 2 |
| NO ModR/M | — | — | — | — | — | — | YES | 1 |

Figure 8:
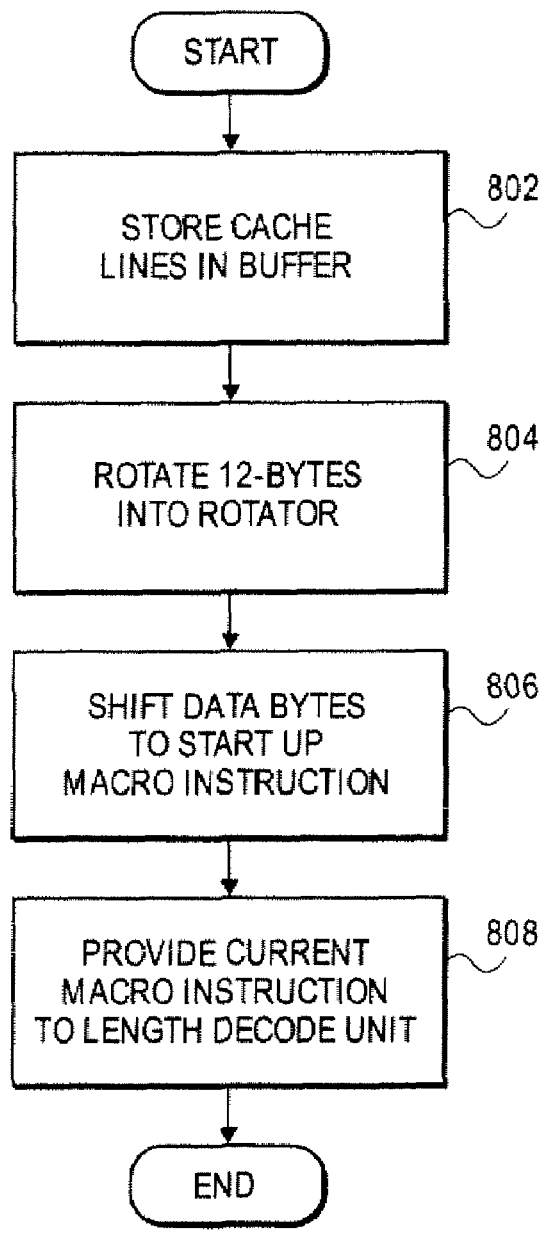
FIG. 8 is a flow diagram illustrating one embodiment of the instruction length alignment process.

FIG. 8 is a flow diagram illustrating one embodiment of the instruction length alignment process. At block 802, ALN 306 stores instruction cache lines in 16-byte buffers 304. At block 804, ALN 306 rotates 12 bytes of the data stream into rotator 504. Rotator 504 rotates the data bytes of two instructions. In one embodiment, an instruction has a maximum length of 11 bytes.

At block 806, ALN 306 uses the length vector obtains from LEN 402 to shift the current instruction into shifter 506. Shifter 506 shifts to the exact instruction start based on the length of the first instruction in the data stream. If rotator 504 does not contain the entire instruction required by shifter 506, rotator 504 rotates instruction data from buffers 502.

At block 808, ALN 306 outputs the current instruction to LEN 402 during the current pipe stage. In one embodiment, the first instruction within the data stream begins at the start of the data buffer. Thus, during the current pipe stage, rotator 504 is obtaining instruction data for the next instruction while shifter 506 is obtaining data for the current instruction in the data stream.

Several variations in the implementation for a system and method for two stage instruction length decode and alignment of macro-instructions have been described.

The specific arrangements and methods herein are merely illustrative of the principles of this invention. Numerous modifications in form and detail may be made by those skilled in the art without departing from the true spirit and scope of the invention.

What is claimed is:

1. A method for aligning an instruction stream, the method comprising:
   inputting an instruction stream into a second shifter, the instruction stream being obtained exclusively from a first shifter;
   determining in a length decoder and in a first clock cycle, a length of a current instruction in the instruction stream;
   if a successive instruction in the instruction stream is contained in the second shifter then shifting the instruction stream to a start of the successive instruction based exclusively on the length of the current instruction, said shifting being performed during the first clock cycle and within the second shifter; and
   if the successive instruction is not contained in the second shifter then shifting the successive instruction into the second shifter from the first shifter in the same clock cycle and shifting the instruction stream to the start of the successive instruction one clock cycle later.

2. The method of claim 1, wherein the second shifter is connected to the length decoder via a latch.

3. The method of claim 1, wherein the first shifter is able to shift 8 bytes of data.

4. The method of claim 1, wherein the first shifter is able to shift 16 bytes of data.

5. A method for aligning instructions in an instruction stream, the method comprising:
   determining a length of a first instruction in the instruction stream during a length decode stage; and
   inputting the length of the first instruction to a two-stage instruction alignment stage comprising first and second shift operations performed by first and second shifters respectively, wherein an output of the first shifter exclusively defines data to be shifted by the second shifter, based exclusively on the length of the first instruction, and wherein an output of the second shift operation comprises instructions of the instruction stream aligned to a start of a successive instruction in the instruction stream immediately following the first instruction, the output of the second shift operation defining an input to the length decode stage, and wherein if the first instruction is contained in the second shifter said first instruction is shifted into a length decoder that performed the length decode stage in the same clock cycle in which the length of the first instruction was determined, and wherein if the first instruction is not contained in the second shifter, said first instruction is shifted from the first shifter one clock cycle later into the length decoder from the first shifter.

6. The method of claim 5, wherein the first and second shifters are connected in series and are synchronized to the same clock cycle.

7. The method of claim 6, wherein the first shifter has a capacity of 16 bytes and the second shifter has a capacity of 8 bytes.

8. The method of claim 5, wherein inputting the length of the first instruction comprises inputting said length directly from the length decoder to the second shifter.

9. The method of claim 5, wherein inputting the length of the first instruction comprises inputting said length from the length decoder to the first shifter via an intermediate latch.

10. Logic for aligning instruction in an instruction stream, the logic comprising:
 a first shifter;
 a second shifter; and
 a length decoder, wherein an output of the first shifter forms a direct input to the second shifter and exclusively defines data to be shifted therein, an output of the second shifter is sent to the length decoder via an intermediate latch, and wherein a length of a current instruction in the length decoder is directly input into the second shifter and the second shifter shifts the data based exclusively on the length of the current instruction, wherein the second shifter has a maximum capacity to shift which is less than the maximum instruction length.

11. The logic of claim 10, wherein a length of the current instruction in the length decoder is input into the first shifter via an intermediate latch.

12. The logic of claim 10, wherein the first shifter has a greater shifting capacity than the second shifter.

13. The logic of claim 10, wherein the second shifter has a capacity of 16 bytes and the second shifter has a capacity of 8 bytes.

14. Logic for aligning instructions in an instruction stream, the logic comprising:
 first shifting means for shifting bytes of the instruction stream;
 second shifting means for shifting bytes of the instruction stream; and length decoding means for determining a length of an instruction in the instruction stream, wherein an output of the first shifting means forms a direct input to the second shifting means and exclusively defines data to be shifted therein, an output of the second shifting means is sent to the length decoding means via an intermediate latching means, and wherein a length of a current instruction in the length decoding means is directly input onto the second shifting means and the second shifter shifting means shifts the data based exclusively on the length of the current instruction, wherein the second shifting means has a maximum capacity to shift which is less than the maximum instruction length.

15. The logic of claim 14, wherein a length of the current instruction in the length decoder means is input into the first second shifting means via an intermediate latch means.

16. The logic of claim 14, wherein the first shifter means has a greater capacity than the second shifter means.

* * * * *